US010551820B2

(12) United States Patent
Bonay et al.

(10) Patent No.: US 10,551,820 B2
(45) Date of Patent: Feb. 4, 2020

(54) METHOD FOR CALCULATING AN OPTIMIZED TRAJECTORY (71) Applicant: Siemens Aktiengesellschaft, Munich (DE)

(72) Inventors: Alexandre Bonay, Erlangen (DE); Stephan Hoja, Cadolzbrug (DE); Frank Knoche, Roesrath (DE); Michael Meier, Erlangen (DE); Ulrich Wolfgang Lorenz, Berlin (DE); Stephan Schaeufele, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 246 days.

(21) Appl. No.: 15/578,098

(22) PCT Filed: Jun. 1, 2016

(86) PCT No.: PCT/EP2016/062378
§ 371 (c)(1),
(2) Date: Nov. 29, 2017

(87) PCT Pub. No.: WO2016/193305
PCT Pub. Date: Dec. 8, 2016

(65) Prior Publication Data
US 2018/0150056 A1    May 31, 2018

(30) Foreign Application Priority Data
Jun. 3, 2015 (EP) ..................................... 15170497

(51) Int. Cl.
G05B 19/40 (2006.01)
G05B 19/41 (2006.01)
(Continued)

(52) U.S. Cl.
CPC ... *G05B 19/4069* (2013.01); *G05B 19/41885* (2013.01); *G05B 2219/32014* (2013.01);
(Continued)

(58) Field of Classification Search
None
See application file for complete search history.

(56) References Cited

U.S. PATENT DOCUMENTS 6,198,246 B1 * 3/2001 Yutkowitz .............. G05B 11/42
318/561
6,642,470 B2 * 11/2003 Tricarico .................. B23H 7/20
219/69.16
(Continued)

FOREIGN PATENT DOCUMENTS

DE      10063089      7/2002
DE     102005024822   11/2006
(Continued)

OTHER PUBLICATIONS

H.C. Fang, S.J. Ong, A.Y.C. Nee, "Interactive robot trajectory planning and simulation using Augmented Reality", Oct. 1, 2010, Robotics and Computer-Integrated Manufacturing 28 (201 2) 227-237. (Year: 2010).*
(Continued)

Primary Examiner — Brian W Wathen
Assistant Examiner — Kelvin Booker
(74) Attorney, Agent, or Firm — Cozen O'Connor (57) ABSTRACT A method for calculating an optimized trajectory via a simulation program and an optimization routine, wherein the trajectory is provided via the simulation program and adapted to boundary conditions, where the method includes a loop in which, as individual steps, a first trajectory is provided, a further trajectory, and the adaptation of the further trajectory is modified based on the boundary condi-
(Continued)

tions, such that the optimized trajectory is a trajectory which has been provided based on an extremal or predetermined parameter, where the optimized trajectory is provided after the calculation by a control device for moving a holder for a component, and where at least one component and the production machine are displayed in a 3D display.

9 Claims, 8 Drawing Sheets

(51) Int. Cl.
G05B 19/4069 (2006.01)
G05B 19/418 (2006.01)

(52) U.S. Cl.
CPC .............. G05B 2219/35009 (2013.01); G05B 2219/45142 (2013.01)

(56) References Cited

U.S. PATENT DOCUMENTS

| | | | | |
|---|---|---|---|---|
| 6,662,067 | B1* | 12/2003 | Xu | G05B 19/41825 700/112 |
| 8,060,340 | B2* | 11/2011 | Gao | G05B 13/04 702/182 |
| 9,096,023 | B2* | 8/2015 | Graf | B29B 15/122 |
| 2003/0193522 | A1* | 10/2003 | Chandhoke | G05B 19/416 715/764 |
| 2004/0046711 | A1 | 3/2004 | Triebfuerst | |
| 2008/0109105 | A1* | 5/2008 | Weber | B21D 43/05 700/178 |
| 2010/0298961 | A1 | 11/2010 | Frisken et al. | |
| 2012/0290131 | A1* | 11/2012 | Khoukhi | B25J 9/1623 700/250 |
| 2013/0037986 | A1* | 2/2013 | Graf | B29C 70/18 264/177.17 |
| 2013/0116828 | A1 | 5/2013 | Krause et al. | |
| 2015/0066400 | A1* | 3/2015 | Schmidt | G05B 11/36 702/60 |
| 2015/0212516 | A1* | 7/2015 | De Schepper | G05B 19/4097 700/182 |
| 2015/0294044 | A1* | 10/2015 | Schaer | B21D 43/05 700/112 |
| 2015/0343733 | A1* | 12/2015 | Lorenz | B30B 15/148 700/97 |

FOREIGN PATENT DOCUMENTS

| | | |
|---|---|---|
| DE | 102012110508 | 5/2013 |
| DE | 102012112172 | 1/2014 |
| EP | 2254013 | 11/2010 |
| WO | WO2014/063262 | 5/2014 |

OTHER PUBLICATIONS

D. Prévost, S. Lavernhe, C. Lartigue, and D. Dumur, "Feed drive modelling for the simulation of tool path tracking in multi-axis High Speed Machining", 2011, International Journal of Mechatronics and Manufacturing Systems 4, 3-4 (2011) 266-284. (Year: 2011).*

C. Rossi, S. Savino, "Robot trajectory planning by assigning positions and tangential velocities", Jul. 26, 2011, Robotics and Computer-Integrated Manufacturing 29 (2013) 139-156. (Year: 2011).*

* cited by examiner

METHOD FOR CALCULATING AN OPTIMIZED TRAJECTORY

CROSS-REFERENCE TO RELATED APPLICATIONS

This is a U.S. national stage of application No. PCT/EP2016/062378 filed 1 Jun. 2016 and claims the priority of European application No. 15170497.0 filed Jun. 3, 2015, the content of which is incorporated herein by reference in its entirety.

BACKGROUND OF THE INVENTION

1. Field of the Invention

The invention relates to a method for calculating an optimized to trajectory of a component, a computer program package for implementing the method, a control apparatus that performs the method and to a production machine, in particular a press, having such a controller.

2. Description of the Related Art

Presses are used in multifarious ways in industrial manufacturing for processing components, in particular sheets, for example, for producing body parts in the automotive industry. Production machines, in particular presses, are usually equipped in an automated manner. The production machine is equipped with a component by way of a holder, with the holder receiving the component and introducing the latter into the production machine. After running through the production method in the production machine, the same holder or a further holder takes the component out again.

WO 2014/063262 A1 and DE 10 2004 024 882 A1 disclose methods for optimizing transport movements.

A problem that arises during the automated introduction of the component via of a holder, particularly in the case of presses, is that the component can only be introduced into the press in a narrow region. A suitable trajectory is required to prevent a collision of the component with the press, in particular the press tools. Regularly, such a trajectory must be created manually before equipping the press with the component. To this end, geometric parameters of the press and optional further parameters are used as boundary conditions for calculating a trajectory via a simulation program. In order to improve a simulated trajectory, the trajectory was modified by qualified staff. However, improvements to the trajectory are cumbersome and require experienced and qualified staff.

SUMMARY OF THE INVENTION

In view of the foregoing, it is therefore an object of the invention to provide a method for the automated optimization of the calculation of a trajectory.

It is also an object of the invention to design the creation of an optimized trajectory in a manner that is intuitive and simple for the user.

These and other objects and advantages are achieved in accordance with the invention by a method and computer program product for executing the method when the computer program product is provided on a computing unit.

A production machine is understood to be a press, in particular a servomechanism press, a crimp device, a processing machine and/or a packaging machine. The invention also may be applied in a machine tool. Advantageously, a conveying apparatus is assigned to such a production machine.

A component is understood to particularly mean a sheet, a workpiece, a semi-finished product, a plastic part or a product that is not yet ready, which is fed to a production machine in order to change its properties. In particular, a component can be a body part, preferably a body part still to be reshaped, such as a motor vehicle. After changing the properties of the component, preferably the shape of the component, the component is again removed from the production machine. The conveying apparatus is provided for placing and/or removing the component.

A trajectory is understood to mean a spatial course of a holder and/or of a component, in particular into the production machine or out of the production machine. The trajectory further describes the spatial alignment of the component and/or the spatial alignment of the holder. It is also possible to transport a plurality of components by one holder and consequently introduce these into the production machine or remove them from the production machine again.

A trajectory is a spatial curve, where individual points of the spatial curve are linked to further variables, where the spatial curve advantageously is storable in a file and savable, and where the spatial points include the locations of the holder and/or the component and alignment of the holder and/or of the component. By way of example, the further variables are the times and/or the speeds that are assigned to the individual points of the spatial curve.

Advantageously, a trajectory is representable and/or savable by way of discrete points, which optionally have further variables assigned thereto, or by way of coefficients of a function, in particular expansion coefficients of a series representation of a function. Expansion coefficients are coefficients that emerge from a previously defined series representation of the trajectory, such as a Taylor series, a Laurent series or a Fourier series of the trajectory. Below, the term "trajectory" denotes a first trajectory, a further trajectory or an optimized trajectory.

A first trajectory is understood to mean a trajectory that was created without a simulation or in a first simulation with the simulation program. The first trajectory is adapted to boundary conditions, in particular via a computer program, such as a CAD program, suitable therefor. Advantageously, a first trajectory is, e.g., produced manually and/or adapted to boundary conditions via a simulation program. By way of example, the first trajectory is created such that a component just does not impact on the edges of the production machine, where it is optionally introduced into a production machine with a small change in the alignment and/or introduced into the production machine or removed from the production machine at a low speed.

A further trajectory is a trajectory that has been modified with the aid of an optimization routine and/or with the aid of a simulation program. A modified parameter is assignable to a further trajectory. A further trajectory emerges from a first trajectory or a further trajectory via a modification.

An optimized trajectory is understood to be a trajectory that has been produced from an extremal parameter, such as a maximum attainable speed or a maximum attainable stroke rate, and that has optionally been adapted to the boundary conditions. An optimized trajectory usually emerges from a further trajectory that has been modified/optimized at least once. The adaptation to the boundary conditions is effectuated with the aid of the simulation program. By way of example, an optimized trajectory is distinguished in that the component can be inserted into and/or removed from the production machine particularly quickly along the extremal trajectory.

An optimized trajectory can also be distinguished in that the time required for feeding the component to the production machine and/or for removing the component from the production machine and/or for transferring the component to another location is minimal.

An optimized trajectory can also be distinguished in that the time duration for feeding the component to the production machine and/or for removing the component from the production machine and/or for transferring the component to another location precisely corresponds to the time duration that the production machine requires for one cycle at maximum operating speed.

The form of an optimized trajectory optionally depends on the speed with which the component and/or the holder traverses the trajectory. Here, the component is fastened to the holder. The form of the trajectory and/or of the advantageous alignment of the component and/or of the holder may therefore change because loads on the component and/or on the holder on account of the acceleration of the same modify the form and/or the position of the component and/or the holder by the action of force.

Boundary conditions are oriented on the dimensions and variables of the production machine, the component and/or the holder, and on optional safety margins between the component and the surface of the production machine that have to be observed. Boundary conditions can be formulated as regions in space into which the component must not penetrate. Boundary conditions can also be regions in which the first trajectory, the further trajectories and the optimized trajectory can be modified. According to the example described here, the boundary conditions are formulated as, for example, maximum and minimum parameters, between which the (modified) parameters can move. Here, there optionally are dependencies of the maximum and minimum values of the (modified) parameters on the values of further (modified) parameters. The trajectories then advantageously extend through regions that are defined by the minimum and/or maximum values of the (modified) parameters.

If the tools of the production machine move during the introduction of the component into the production machine or during the removal of the component from the production machine, the boundary conditions are time-dependent.

By way of example, if a press tool of a press performs a periodic movement and the movement is not stopped when introducing the component into the press and/or when removing the component from the press, then the boundary condition has a periodic time dependence.

Boundary conditions can also comprise maximum rotational speeds of motors, maximum stroke rates of the press, maximum accelerations of the component and/or the holder, minimum throughput times and movement-dependent deformations of the holder and/or the component.

In the case of an infringement of boundary conditions, there can be an unexpected collision between the component and the production machine, in particular a tool of the production machine.

A parameter is understood to mean an optimizable variable or a set of optimizable variables that is/are a property of an aforementioned trajectory. A parameter can be a speed with which a holder and/or component traverses the trajectory, a traversal time and/or a stroke rate in the case of a press.

The parameter or the components of the parameter and the modified parameter or the components of the modified parameter are advantageously arrangeable. The number of components of the parameter or of the modified parameter advantageously orients itself on the trajectory and may vary from trajectory to trajectory.

A modified parameter is understood to mean a parameter that emerges from a further trajectory and/or that was modified, in particular by the optimization routine. Based on a further parameter, a further trajectory is created based on a suitable procedure.

The modified parameter can be a number or a number tuple emerging from the first trajectory and/or a further trajectory and emerging via a calculation rule of the optimization routine.

By way of example, a calculation rule is a genetic algorithm, a generic algorithm, a calculation method based on a neural network or a calculation method based on a predetermined sequence.

The modified parameter is advantageously ascertained via the optimization routine in accordance with a calculation rule as described above.

An extremal value is understood to mean a parameter which, compared with a number of modified parameters, represents a maximum, a minimum or an optimum. By way of example, an extremal value is a maximum speed or maximum stroke rate or a minimal obtainable time duration.

Accordingly, a predetermined value is a predetermined maximum speed of a holder or a maximum performable stroke rate of the production machine, preferably the press.

An optimization routine is a calculation rule that calculates a further trajectory or an optimized trajectory from an input trajectory, such as a further trajectory. The further trajectory, which is created via the optimization routine, is fed to the simulation program. An optimization routine can also be written as a script, for example as a shell script. Hence, an available simulation program need not necessarily be modified. An optimization routine can also be present as an independent program, as a script, as an add-on and/or, preferably, as a subprogram of the simulation program.

In an advantageous embodiment, the optimization routine loads the first trajectory or the further trajectory from a memory. A parameter is determined from a first trajectory. A modified parameter is determined from the further trajectory. The parameter or the modified parameter is modified via a calculation rule. The calculation rule advantageously has, as input variables, the trajectories, which were optionally already created in previous run-throughs, and/or the already calculated (modified) parameters. A (new) modified parameter and/or a further trajectory are calculated using these input variables via the calculation rule. When a modified parameter is calculated, the further trajectory can be produced from the modified parameter. Accordingly, the further trajectory is either saved and/or fed to the simulation program.

Advantageously, a plurality of further trajectories are produced using the optimization routine, where either one of the further trajectories is selected for transfer to the simulation program or the simulation program performs a simulation for a plurality of further trajectories and thereupon transfers the further trajectory that was found to be most suitable via simulation back to the optimization routine. It is also possible to select, from a plurality of trajectories, a further trajectory that is transmitted to the simulation program. Further, the plurality of trajectories can also be adapted to the boundary conditions with the aid of the simulation program and a selection can be performed in due course. By way of example, a method thus configured is applied in the case of a genetic algorithm. Of the further trajectories, the best-suited one is the one assigned to the extremal parameter. Advantageously, only a selection of the calculated modified trajectories, preferably the modified trajectory (trajectories) with the best modified parameter (parameters), are transferred to the simulation program.

The simulation program simulates an introduction of the component into, and/or a removal of the component from, the production machine. Here, a check is performed based on the boundary conditions to determine whether the first trajectory or the further trajectory created by the optimization routine satisfies the boundary conditions. If the further trajectory does not satisfy the boundary conditions, then the trajectory is slightly modified and/or transferred to the optimization routine with a corresponding attribute. If the further trajectory satisfies the boundary conditions, then it is transferred to the optimization routines for further modification/optimization. If the optimized trajectory satisfies the boundary conditions, then the latter is stored with an attribute and/or transferred to the control apparatus in the form of coefficients and/or functional values.

A simulation program is also able to calculate a trajectory for a component based on boundary conditions such that the component can be introduced into the machine at a set speed. The simulation program can be part of an optimization routine. Here, the form and the dimensions of the at least one component, the form and the dimensions of the production machines, in particular the press tools, serve as boundary conditions. The boundary conditions ensure collision-free equipping of the production machine with the at least one component.

Such a calculation method is advantageous on account of the improved calculation of an optimized trajectory. Particularly if a plurality of modified trajectories are compared to one another, an extremal trajectory, which even a skilled specialist could not have found manually, can be found in accordance with the invention.

It is further advantageous that even time-dependent extremal trajectories can be found via the presently described embodiments of the method described in accordance with the invention. Additionally, the time required for optimizing a trajectory is significantly shorter.

In an advantageous embodiment, the first trajectory, the further trajectory and the optimized trajectory has time as a component or depends on time.

In this disclosure, the first trajectory, the further trajectory and the optimized trajectory are referred to as trajectory if this refers to a trajectory whose properties are shared by all trajectories listed here.

A trajectory can depend directly on time. Then, it should be understood the component depends directly on time. By way of example, this is the case if a component traverses a path in a different time than a component that will pass along a trajectory subsequently in time. Likewise, within a portion of the trajectory, the time that the holder and/or the component requires for this portion of the trajectory can be different from the time that the holder and/or the component requires for a different portion of the trajectory with the same length. Thus, it may be necessary to reduce the speed of the traverse of the trajectory in a region in which the trajectory is strongly curved. The time can be an absolute time, a periodically recurring time interval or an inherent time of the holder.

However, the trajectory may also depend on parameters which in turn depend on time.

The formal representation of the time dependence of the trajectory advantageously depends on the configuration of the optimization routine and/or the simulation program.

Further possible embodiments of the method for calculating an optimized trajectory are listed below. The trajectory can also depend on parameters which in turn depend on time. The formal representation of the time dependence of the trajectory advantageously depends on the configuration of the optimization routine and/or on the simulation program.

In a further advantageous embodiment, the size and form of the component, the size and form of the production machine, the size and form of the holder and/or deformation of the component and/or of the holder are included as boundary conditions.

Boundary conditions serve to allow the simulation program to avoid a collision between the holder and/or the component and the production machine, in particular one of the press tools of a press. If the production machine has movable parts that can collide with the holder and/or the component, then the boundary conditions are advantageously dependent on time. Boundary conditions can also be understood to be restrictions in the movement of the holder and/or the component and/or on the form of the trajectory. As a result of the time dependence of the boundary conditions, the space of possible trajectories is enlarged.

In a further advantageous embodiment, the first trajectory, the further trajectory and the optimized trajectory are a function of the location of the component and/or of the holder, the alignment of the component and/or of the holder, and/or of time.

The alignment of the holder and/or the component is understood to mean the (solid) angle that the component and/or the holder assume relative to the vertical direction. The location is the point at which a set point of the holder and/or the component is situated in space. The set of spatial points that the set part of the holder or the component traverses can be defined as a trajectory. In addition to the location, the time and the alignment, further dependencies can be included in the description of the trajectory, such as the traverse speed or the acceleration of the component and/or the holder.

The trajectory can be specified by manifold points in a space or by coefficients of a set function (spatial curve). Advantageously, a particularly accurate and flexible description of the trajectory is possible in the case of the representation of points. By contrast, a particularly compact representation of the trajectory is possible when representing the trajectory by coefficients.

The trajectories are provided in both representations in a particularly advantageous manner. Thus, the trajectories can be accepted and processed further by a large number of control apparatuses, i.e., used by a control apparatus for controlling the equipping of the production machine.

In a further advantageous embodiment, the optimized trajectory is transmitted to a control apparatus as function values and/or as coefficients.

The control apparatus serves to actuate the electrical machines, where the production machine is equipped or emptied again with the aid of the electrical machines. By way of example, a control apparatus can be a motor controller for controlling a plurality of motors that are matched to one another, such as a SIMATIC or a SINUMEKIK manufactured by Siemens AG.

In a further advantageous embodiment, the parameter and the modified parameter are at least a speed, where the extremal value is a maximum speed.

The parameter or the modified parameter is calculated from a first trajectory and/or a further trajectory in the optimization routine. Initially, a parameter or modified parameter is derived to this end in the trajectory assigned to the optimization routine. The parameter is subsequently modified. The further trajectory is determined or calculated from the modified parameter. The parameter or the modified parameter is a measure for the degree of optimization of the (further) trajectory. Advantageously, the parameter approaches an extremal parameter or predetermined parameter. When the further parameter reaches the extremal parameter or the predetermined parameter, the trajectory that has emerged from the extremal or predetermined parameter is optimized.

A (modified) parameter can be a speed, a stroke rate or a minimum distance of the component and/or the holder from the production machine. An extremal parameter can be a maximum speed such that the holder and/or the component traverses the trajectory in the shortest possible time. The parameter or the modified parameter can also represent a stroke rate, in particular of a press, or a pass number.

In the case of a particularly user-friendly configuration of the computer program package, the above-explained embodiments of the method execute independently after selecting at least one option, in particular by clicking a button.

In an advantageous embodiment of the method, the production machine and the at least one component are presented in a three-dimensional virtual space with the aid of a 3D display (VRD).

A display of the production machine, in particular of a press, and the at least one component is effectuated by a 3D display that is suitable for presenting processes in virtual space, in particular for presenting a virtual reality. A human-machine interface (HMI) is suitable for display purposes. A technical embodiment of such a 3D display is given by a holographic representation method or, particularly advantageously, by a device for virtual reality such as a VR display device (virtual reality HMI). Such a VR display device can have an alignment sensor such that the user can look back and forth in space and consequently completely cover the virtual space by observation windows. Thus, the user is advantageously able to observe the entire production machine and the entire movement of the component along the trajectory.

When a plurality of VR display devices are used, a plurality of users are able to simultaneously observe the production machine and/or the component, in particular in terms of its movement along the optimized trajectory. It is not necessary for the users to have to be in the same room.

As a result of Internet or intranet connections, the users are able to be situated at different locations.

An advantageous representation emerges from a moving image that shows the production machine, in particular the press, and the at least one component with their envisaged movements.

In the process, one of the components can be placed along the optimized trajectory into a position provided for the component.

For the purposes of elucidating the movement of a component, the optimized trajectory also can be displayed as a visible path.

Virtual reality data glasses, Google Glass (data glasses), a projection screen, a screen (respectively with the option of the 3D representation) and/or a head mounted display are suitable as a VR display device.

As a result of the representation in 3D space, the user can advantageously obtain a quick and intuitive idea about the movement relationships between the production machine, in particular the individual tools thereof, and the at least one component. Problems in the motion sequences and improvement options thus can be gathered easily and intuitively.

In a further advantageous embodiment, at least the component is displayed moving along the optimized trajectory.

The optimized trajectory of the moving component can be displayed, for example, by a solid line on which the component moves. If the component rotates orthogonally in relation to the movement direction in accordance with the optimized trajectory, a representation of the optimized trajectory as a widened line, for example as a band, is also possible. The band can elucidate the rotation by changing the orientation of the surface.

Advantageously, by representing the optimized trajectory, the user is able to identify the regions in which a further optimization of the movement processes of the production machine and/or equipping of the same with at least one component appears possible and/or required.

In a further advantageous embodiment, an infringement of the boundary conditions by the production machine when moving the component is displayed. Here, the collision is represented by a modified colored marking of the component or of a region of the production machine. Advantageously, a glowing color marking is used to represent the collision, said glowing color marking conspicuously distinguishing itself from the further representation and consequently not being able to be missed by the user or users.

By a timely display of a collision of the component, in particular with the production machine, the user can identify whether the optimized trajectory for the component satisfies the boundary conditions in terms of the collision. Consequently, it is also possible to check the effects of a modification of a boundary condition and/or a modification of the optimized trajectory.

In a further embodiment of the method, the movement of the component into the production machine or out of the production machine can be observed by at least one user with the aid of a representation device.

The movement of the at least one component can be observed simultaneously by a plurality of users. The simultaneous observation of a movement sequence can be effectuated from different positions or viewing directions of the individual users. Thus, a first user can observe the component from one side and a second user can observe the same component from a different side or from a different position.

Advantageously, the users can observe and optionally assess the behavior of the production machine and the component in motion.

The playback speed can be selected independently by each user. Thus, it is possible to meet the individual requirements of each user separately.

In a further advantageous embodiment of the method, the infringement of the boundary conditions by the production machine when moving the component is displayed.

It is further advantageous for the boundary conditions to be displayed to the user, for example, in the form of a bar chart. The display can be displayed in an observation window. Boundary conditions that are particularly suitable for display are: the engine power of a drive of the production machine, speeds of tools and/or one of the components, holding forces.

In a further advantageous of the method, at least one user modifies the optimized trajectory with the aid of at least one VR input device, where the optimized trajectory is converted into a first trajectory by the modification of the optimized trajectory, and where the first trajectory is re-optimized and displayed using the method for calculating an optimized trajectory in accordance with the above-described embodiments of the method.

By way of example, an optimized trajectory is modified with a cursor that selects a point or a region of the optimized trajectory with the aid of the VR input device. The point or the region of the optimized trajectory can be modified by movement of the cursor. The modification can be displayed to the user.

A joystick, a 3D mouse with a 3D movement sensor or a data glove are suitable as a VR input device. Further, there may be an input by speech control. The use of a joystick or a plurality of joysticks was found to be particularly advantageous for the invention. Therefore, VR input device and joystick are used synonymously below.

A region or a point of the trajectory is selected via the cursor and subsequently displaced by the user.

The point-wise or region-wise displaced optimized trajectory forms a first trajectory in the method for calculating an optimized trajectory, with the first trajectory being re-optimized to form an optimized trajectory with the aid of the optimization routine, taking into account the boundary conditions.

Advantageously, such a procedure facilitates influencing of the method for providing an optimized trajectory by an intuitively grasping and thinking user. Consequently, an experienced user is able to provide a stimulus in a direction of the optimization that the method for providing the optimized trajectory improves. At the same time, the user can strengthen their intuition for how a point-wise/region-wise modification of an optimized trajectory effects the course of the optimized trajectory.

Displaying a collision of the component with the production machine via colored markings in the regions of the production machine and/or of (the part of) the component advantageously strengthens the intuition of the user for the processes described herein.

Advantageously, an improvement of the method for calculating the optimized method may emerge from the inclusion of the user or a plurality of users. The user may identify that a minimum is only a local minimum when optimizing the trajectory and improve the calculation of the optimized trajectory by a manual intervention. If the simulation program and/or the optimization routine has an autonomously learning portion, e.g., a neural network, the method can be improved/trained overall via this interaction.

In a further advantageous embodiment, the production machine and the at least one component are displayed at least partly transparently.

A transparent or partly translucent presentation of the component and/or the production machine can be effectuated by displaying the edges and/or corners by lines, in particular in a perspective presentation. Areas can be presented with a different degree of transparency. A line (edge) is not presented transparently, here.

As a result of an at least partly transparent production machine and/or an at least partly displayed component, the at least one user is able to see through the production machine and/or through the component. Consequently, the user/the users can also see processes that are hidden behind or under the component and/or the production machine.

In an advantageous embodiment of the method, the view of the production machine and/or of the component can be displayed from a plurality of points and/or from a plurality of orientations, where the user can choose the point and/or the orientation.

The representation from different points also includes views from the interior of the component and/or from the interior of the production machine. By displaying the movement processes from a plurality of points, the user or the users can observe the movement from a perspective that is unavailable in a physical, real model of the production machine. Consequently, the representation in accordance with at least one aspect of the invention is very well suited to the user who should subsequently operate the production machine becoming acquainted therewith.

A modification of the alignment of the observation window for the user is advantageously effectuated by aligning the head of the user. A modification of the point from which the observation window emanates is advantageously possible via the VR input device or by speech input.

In a further advantageous embodiment, the production machine and/or the at least one component are displayed to at least two users, where a non-observance of the boundary conditions, in particular a collision between the component and the production machine, is displayed to at least one of the users.

The simultaneous display of a collision of the at least one component with the production machine for a plurality of users is effectuated, for example, with the aid of a plurality of VR display devices, in particular VR data glasses.

Different speeds of the displayed movement process are possible in the case of a plurality of users. The first user can select a display speed, i.e., the speed of the movement processes of the production machine and/or the speed of the component along the (optimized) trajectory, which differs from the display speed of the second user.

By simultaneously displaying the movement processes described here to a plurality of users, the latter can replace one another. Such a replacement may advantageously serve to educate one of the users.

The method is advantageously performed by a computing unit, in particular a personal computer. Here, the computing unit has a 3D display or at least a connection option for a 3D display. Particularly advantageously, the computing unit has at least one VR display device and optionally at least one VR input device or at least connectors therefor. The method is performed out by virtue of the computer program product being loaded into a memory of the computing unit and being executed with the aid of a CPU (central processing unit). Advantageously, the computer program has the following parts:

A file, in which the position, size and form of the production machine and of the at least one component is specified. Optionally, the file can also include the trajectories and the boundary condition, as well as the movement processes.

An optimization routine, in particular a "solver".

An interface, where the interface is provided for presenting the movement processes with the aid of the hardware of the computing unit. The interface serves to present the ascertained movement processes with the aid of the 3D display.

The computer program package advantageously serves to perform the disclosed embodiments of the method, where the simulation program often already exists as at least one part of the computer program package. The optimization routine advantageously can be integrated into the simulation program. The disclosed embodiments of the method are advantageously selectable as a menu item on the user interface (human-machine interface). When incorporating such an inclusion of the optimization routine, the start can be generated via a button. By way of example, the method is started by clicking such a button and the method continues until the trajectory has become an optimized trajectory. Subsequently, the optimized trajectory in the forms explained above is transferred to the control unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Below, the invention is described in more detail and explained on the basis of the exemplary embodiments presented in the figures, in which.

DETAILED DESCRIPTION OF THE EXEMPLARY EMBODIMENTS

Figure 1:
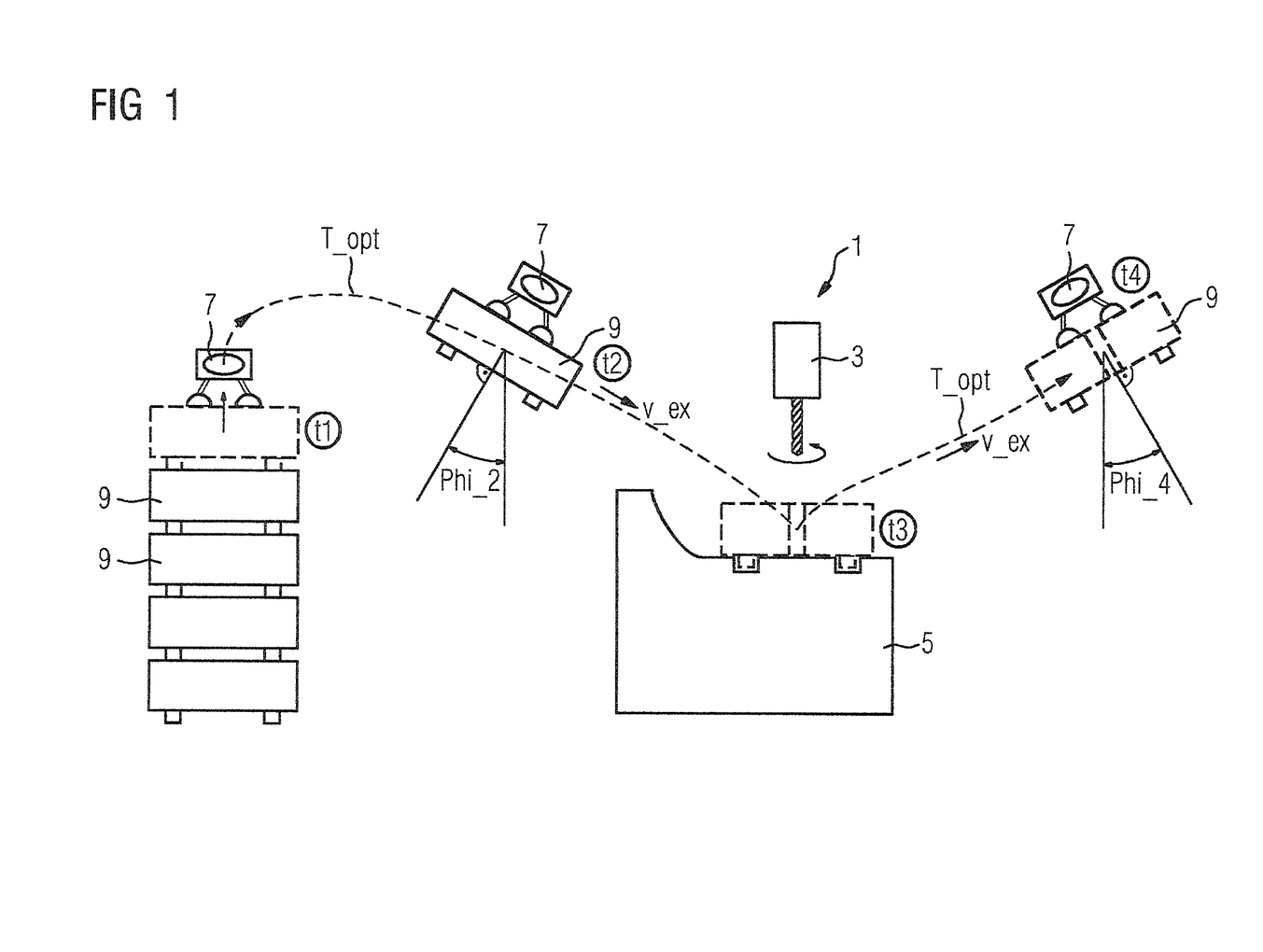
FIG. 1 shows a production machine, a component and a trajectory.

FIG. 1 shows a production machine 1, a component 9 and a trajectory T_opt. At time t1, the components 9 are received by the holder 7 and conveyed along the trajectory T_opt into the production machine 1. Here, the component 9 and the holder 7 move along the trajectory T_opt. At time t2, the component 9 is aligned in terms of its alignment Phi_2 with the aid of the holder. At time t2, the component 9 and the holder 7 have a speed v. The speed advantageously is a function of the time t and/or the position or alignment Phi of the component. The component 9 is inserted into the production machine 1, in particular into the lower tool 5 of the production machine 1, by the holder 7. In the production machine 1, the component 9 is processed by the upper tool 3. Here, a drill 3 or a part of a milling machine 3 serves as upper tool 3. After the processing in the production machine 1, the holder 7 re-receives the component 9 at the time t3 and guides the component 9 out of the production machine 1 along an optimized trajectory T_opt. At time t4, the component 9 is on its path to a new station. The component has a speed v at each time t1, t2, t3, t4. At time t2, the component 9 and the holder 7 have an alignment Phi_2. At time t4, the component 9 and the holder 7 have an alignment Phi_4. Here, the speed v represents a parameter v, v' that decisively influences the quickness of production. The alignment of the workpiece 9 and/or the holder 7 is predetermined at all times by the alignment Phi.

Figure 2:
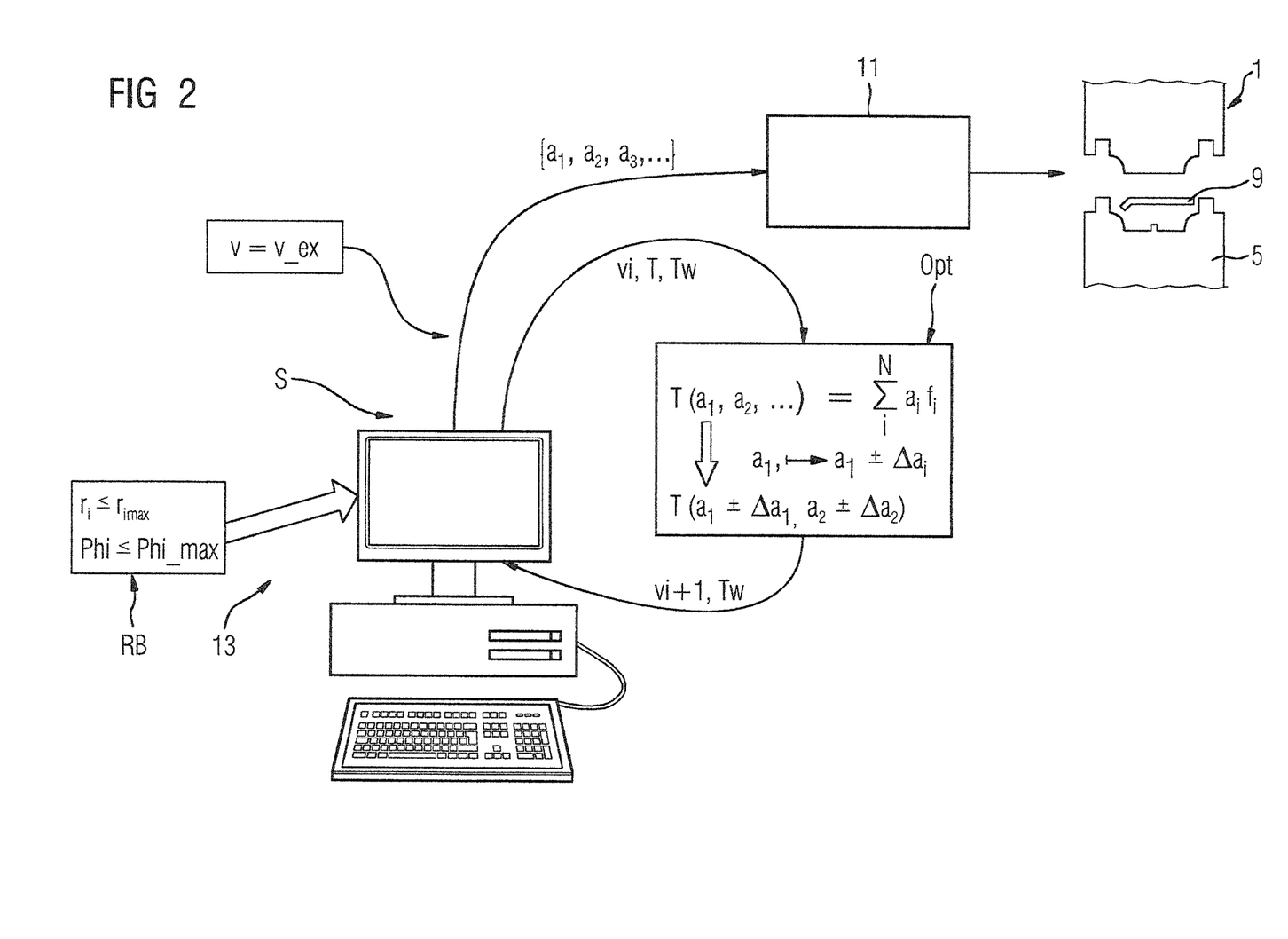
FIG. 2 shows a methodology for calculating an optimized trajectory.

FIG. 2 shows a methodology for calculating an optimized trajectory T_opt. The computing unit 13, for example, a personal computer 13, on which the simulation program S is installed and executed is shown. The optimized trajectory T_opt is calculated with the aid of the simulation program S and/or the optimization routine Opt. Further, the optimization routine Opt is also installed on the computing unit 13. Even if the optimization routine Opt may be part of the simulation program S, the optimization routine Opt is illustrated separately from the simulation program S. The method starts with predetermining a first trajectory T1, such as manually by a user. The first trajectory T1 may also be created by prescriptions of the user using the simulation program S. Further, boundary conditions RB are predetermined, where the boundary conditions RB, too, advantageously may have been ascertained from CAD drawings of the production machine 1, of the at least one component 9 and optionally further variables via the simulation program S. Here, a parameter v is ascertained in a first run of the method, advantageously by the simulation program S. It is also possible to determine the parameter v with the aid of the optimization routine Opt. After calculating the (first) trajectory T1, the (first) trajectory T1 and, optionally, the parameter v or the further parameter vi are transmitted to the optimization routine Opt. In an advantageous manner, a representation of the trajectory $T(a1, a2, \ldots)$ is provided in the optimization routine Opt, for example, as a series representation. The coefficients $a_i$, $i=1, \ldots, N$ of the series representation of the trajectory $T(a_1, a_2, \ldots)$ are modified in a further step in accordance with a deterministic or probabilistic scheme. By way of example, the individual coefficients $a_1$ are increased $a_i + \Delta a_i$ or decreased $a_i - \Delta a_i$. A modified trajectory $T(a_1 + \Delta a_1, a_2 + \Delta a_2, \ldots)$ is created from the coefficients $a_i + \Delta a_i$ modified thus. Advantageously, the modified trajectory $T(a_1 + \Delta a_1, a_2 + \Delta a_2, \ldots)$ is again normalized to the first trajectory $T(a_1, a_2, \ldots)$.

The modified trajectory $Tw = T(a_1 + \Delta a_1, a_2 + \Delta a_2, \ldots)$ is then transferred to the simulation program S. The simulation program adapts the modified/further trajectory Tw such that the boundary conditions RB are observed. Advantageously, the simulation program S is able to compare the further trajectory Tw with the preceding trajectory T based on its new properties. By way of example, the parameters vi, vi+1, v, v' serve as a standard of comparison. By way of example, if the parameter vi, vi+1, v, v' is the speed vi, vi+1, v, v' with which the component 9 is introduced into, and/or removed again from, the production machine 1, the modification of the trajectory T, Tw should be evaluated as a step in the right direction toward the form of the optimized trajectory T_opt.

The above-described loop is executed until the changes Δai of the modified parameter vi, vi+1 after moving through the loop drop below a predetermined value or as soon as the modified parameter drops below a predetermined range. The trajectory T and the further trajectory can be transferred between the simulation program S and the optimization routine Opt in the form of parameters v, v+1, as trajectories T, Tw and/or in the form of coefficients a1, a2, . . . .

The optimized trajectory T_opt obtained during the last pass through the loop is transmitted to the control apparatus 11 in the form of coefficients $a_1, a_2, \ldots$ when the extremal parameter v_ex is obtained. The control apparatus 11 controls equipping of the production machine 1 with the components, in particular by controlling the run-through optimized trajectory T_opt of the holder 7 for the component 9.

For calculating or providing the optimized trajectory, as shown in FIG. 1 and FIG. 2, note should further be taken of the following:

In particular, FIG. 2 discloses a methodology of the first run through of the loop for calculating the optimized trajectory T1. Proceeding from the first trajectory T1, whether the first trajectory T1 meets the boundary conditions RB is ensured with the aid of the simulation program S. If the boundary conditions RB are not satisfied by the first trajectory T1, then the first trajectory T1 is adapted with the aid of the simulation program S. The first trajectory T1 is then transmitted to the optimization routine Opt. A parameter v is ascertained from the first trajectory T1 (and/or a further trajectory Tw) with the aid of the optimization routine. The parameter v is modified into a modified parameter v' with the aid of the optimization routine Opt. A further trajectory Tw is produced with the aid of the modified parameter v'. The further trajectory Tw is transmitted to the simulation program S. The further trajectory is adapted to the boundary conditions RB with the aid of the simulation program S. After adapting the further trajectory Tw, the further trajectory Tw is transferred back to the optimization routine, where a parameter v is produced in the further trajectory Tw with the optimization routine Opt. The parameter v is converted into a modified parameter v' with the aid of the optimization routine Opt. A further trajectory Tw is created with the aid of at least the modified parameter v'.

When creating the further trajectory Tw and/or the modified parameter v', it is also possible to take into account the (modified) parameters v, v' and/or already produced and optionally stored (further) trajectories T1, Tw.

As soon as the modified parameter v' has reached a certain value v_ex or certain values v_ex, the optimized trajectory T_opt can be calculated from the further trajectory Tw. Optionally, the optimized trajectory is checked one more time against the boundary conditions RB. The optimized trajectory is then provided to the control apparatus 11 of the production machine 1.

The presented method can be used advantageously for carrying out, in particular, a simulation for presses, such as the software "Press Line Simulation" by Siemens AG. Here, a simulation scenario is represented via the simulation program. Examples of a simulation scenario include the setup of a press or production machine 1, or a collision analysis. The parameters v, v' are advantageously modified taking into account a transfer curve (trajectory T, further trajectory Tw, or optimized trajectory T_opt).

Results of a method presented here are, for example, a collision report, a stock list for the components 9 to be transported by the holder 7, a list of programming values and/or a simulation video or sequence of images.

The method for calculating an optimized trajectory advantageously is effectuated in two steps. Firstly, changing variables such as the trajectory T, Tw, T_opt until collisions between the component 9 and/or the holder and one further element, in particular the production machine 1 and/or the press 1, no longer occur. Secondly, optimizing the speed v, v', v_ex of the component 9 along such a trajectory T, Tw, in particular an optimized trajectory T_opt, and/or optimizing the stroke rate v, v', v_ex of a press 1 or the production machine 1.

Advantageously, a "solver" serves as a basis for an optimization method. Preferably, a solver is open source software that contains a general optimization algorithm and that can be adapted to the respective case. Such an adaptation is advantageously effectuated by specifying all sorts of parameters, values that influence the solver, and by adding dedicated program code to this solver software. An addition may also be effectuated within the scope of a "software add-on".

Trajectories T, T1, Tw, T_opt are often also referred to as transfer curves or transport curves. These curves are continuously updated during the simulation with the aid of the simulation program S, optionally with the aid of an optimization routine Opt as presented here, until an optimum has been reached. Advantageously, a method described herein can be effectuated after setting up the production installation which has a production machine 1. During operation of the production installation, there is then only fine-tuning of the optimized trajectory.

Advantageous variables for the parameters or for the boundary conditions are distance values between component 9/holder 7 and the further elements (such as the production machine 1) to be observed. Advantageously, further parameters are also oriented toward the alignment (rotational values) of the component 9, and start times ti, t and/or end times ti, t of the component 9 and/or of the holder 7 when traversing along the (optimized) trajectory T, Tw, T_opt.

Advantageously, there is also a variation in the number of "nodes" of the (optimized) trajectory T, T_opt, Tw. Nodes are spatial points that define/span the (optimized) trajectory T, T1, Tw, T_opt.

In the following figures, hatched arrows indicate an option for direct influence by the user B, B1, B2 on the illustrated production machine 1, the illustrated component 9 and/or the illustrated optimized trajectory T_opt. The influence can be effectuated by a cursor, analogously to an operation of the operating system MS Windows.

Figure 3:
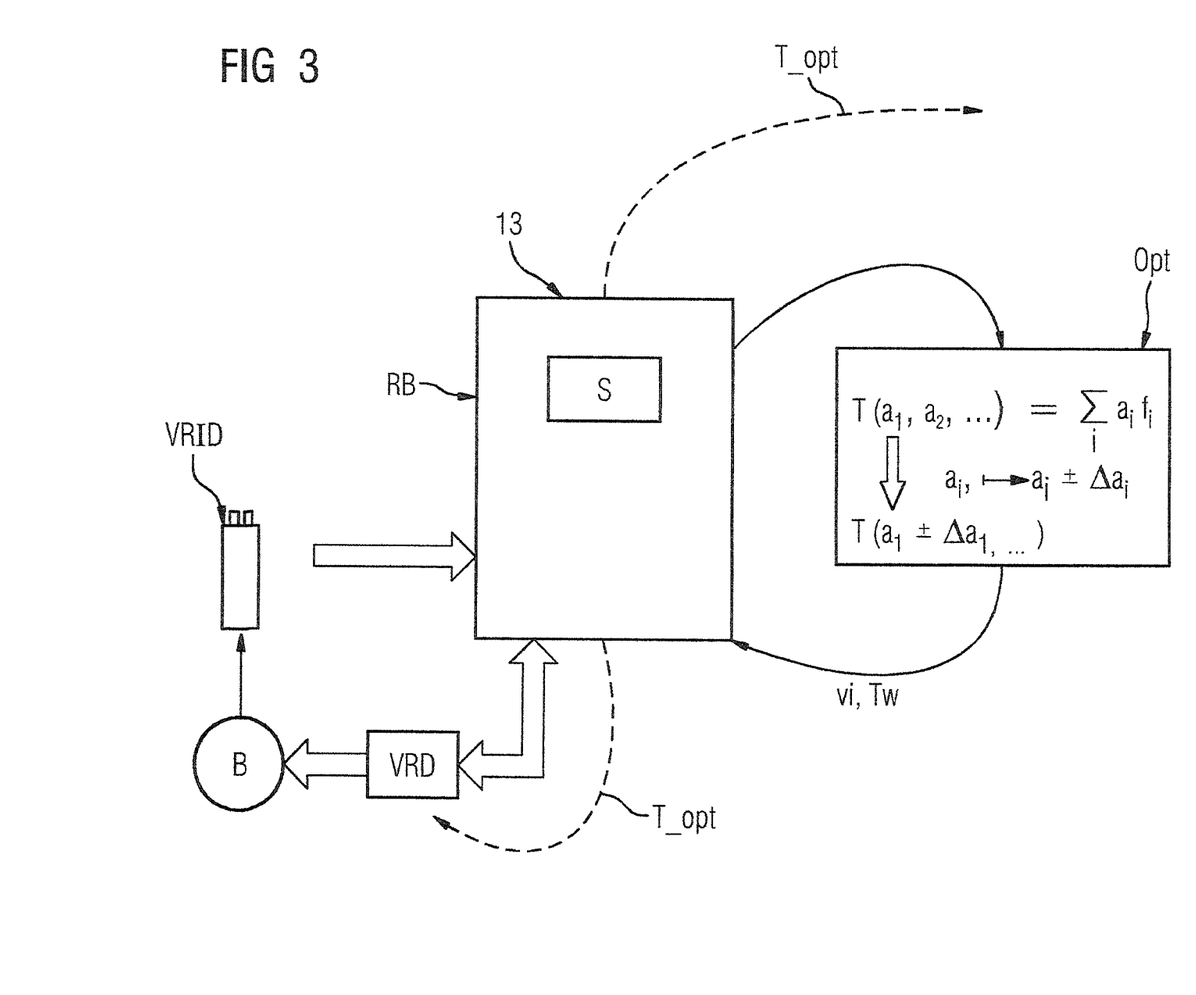
FIG. 3 shows the influence of a user on the method for providing an optimized trajectory.

FIG. 3 shows the influence of a user B1, B2 on the method for providing an optimized trajectory T_opt. Shown centrally is the computing unit 13, which is, e.g., formed by a computer 13. The simulation program S is installed on the computing unit. The simulation program S serves to implement the method for providing an optimized trajectory T_opt. As also illustrated in FIG. 2, the optimized trajectory is calculated by an interplay between the optimization routine Opt and the simulation program S. The optimization routine Opt can also be integrated into the simulation program S.

The boundary conditions RB and, optionally, a first trajectory T1 are input variables for the simulation program. The simulation program S provides the optimized trajectory to the 3D display VRD, in particular to a VR display device VRD. The virtual 3D display VRD can be virtual reality data glasses VRD (virtual reality data glasses, head-mounted display) or a 3D screen/3D-capable projector with a corresponding projection screen. The 3D display VRD shows the user B the component 1, in particular the envisaged movement of the component 1. Advantageously, the production machine 1 and, optionally, the optimized trajectory T_opt are also displayed to the user B. Advantageously, the component 9 is displayed moving along the optimized trajectory T_opt. Further, the production machine 1 is advantageously displayed to the user in the moving state. The optimized trajectory T_opt specifies the movement of the component 1. The user B can influence the profile of the optimized trajectory T_opt with the aid of a VR input device VRID, such as a joystick VRID or a data glove. A speech control, a gesture control or the like is also suitable as a VR input device.

If the user B modifies the optimized trajectory T_opt at least in regions, the simulation program S again optimizes the optimized trajectory T_opt (modified in regions). The method for calculating the optimized trajectory T_opt in this case repeatedly executes on the computing unit and the simulation program. The optimization of the trajectory T_opt proceeds such that the displayed optimized trajectory T_opt for component 1 again meets the boundary conditions. For as long as the optimized trajectory (optimized trajectory modified at least in regions) T_opt (still) does not meet the boundary conditions RB, it is possible to display this by a representation, in particular by colored highlighting, of the collision points between the component 9 and the production machine 1.

The simulation program treats the modified optimized trajectory (optimized trajectory modified at least in regions) T_opt like a first trajectory T1 again. With the aid of the method in accordance with disclosed embodiments of the invention, a new optimized trajectory T_opt is calculated. Optionally, the optimized trajectory T_opt can be forwarded from the simulation program S and/or stored on a data medium.

Figure 4:
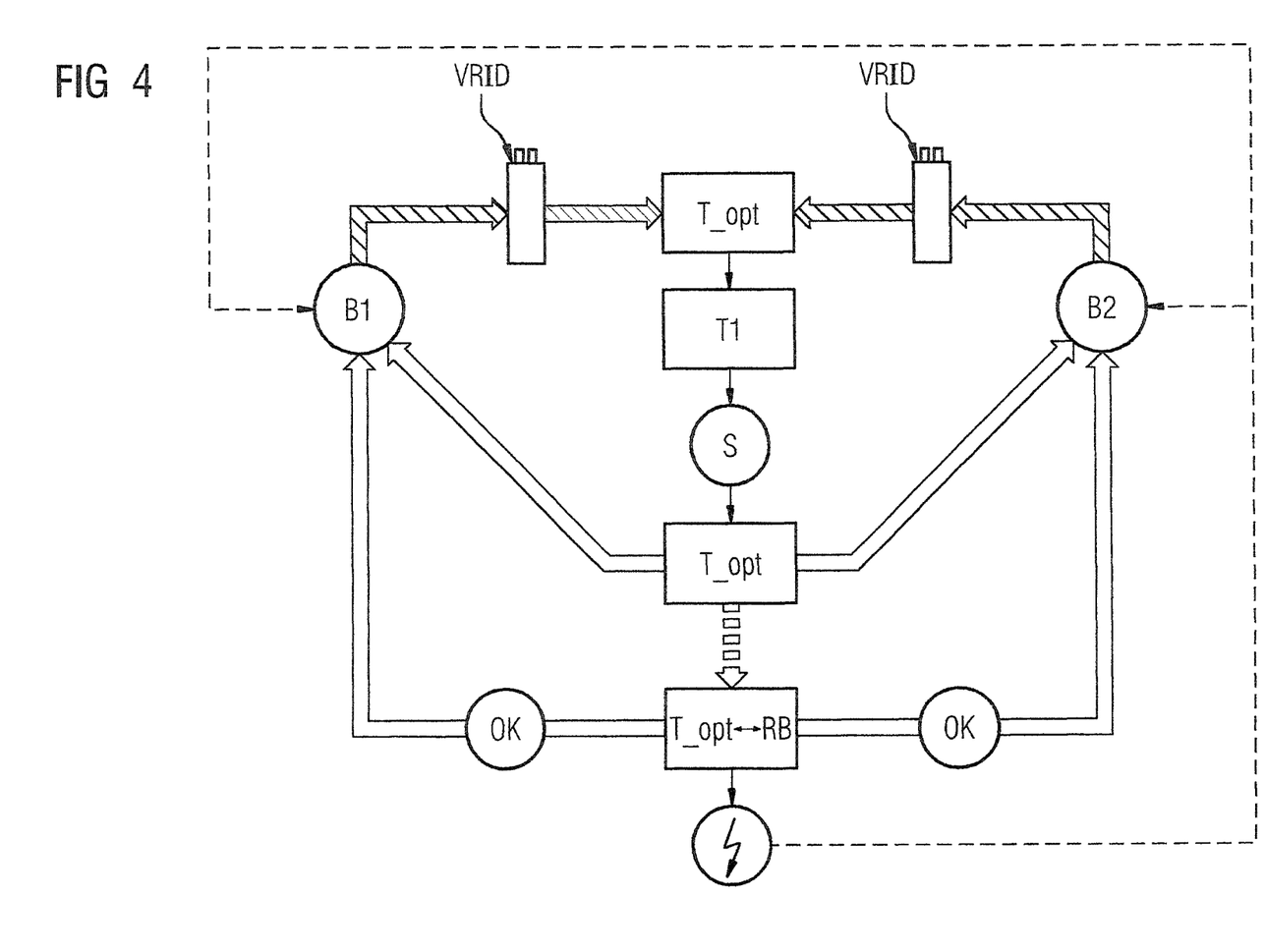
FIG. 4 shows the influence of a first user and of a second user.

FIG. 4 shows the influence of a first user B1 and a second user B2. Proceeding from an optimized trajectory T_opt, which has been modified by a first user B1 and/or second user B2, the optimized trajectory T_opt, as indicated above, becomes a first trajectory T1 again or is treated as such. The first trajectory T1 is converted into the optimized trajectory T_opt with the aid of the simulation program S. The (newly calculated) optimized trajectory T_opt is presented to the first user B1 and/or the second user B2 in the 3D display (VRID). Whether the optimized trajectory satisfies the (optionally modified) boundary conditions RB is ascertained in a further step. Should this not be the case, for example, as a result of an insufficient degree of optimization of the optimized trajectory T_opt, a possible collision can be displayed to the user B1, B2. If the optimized trajectory T_opt meets the boundary conditions RB, this is likewise advantageously displayed to the first user B1 and/or the second user B2. The users B1, B2 can modify the optimized trajectory in turn with the aid of the VR input device VRID (virtual reality input device). Thereupon, the method shown here can start anew.

In the case of an insufficient degree of optimization of the optimized trajectory T_opt, i.e., the boundary conditions RB, in particular in relation to possible collisions of the component 9 with the production machine 1, this nonobservance of the boundary conditions RB is displayed to the first user B1 and/or the second user B2. This display can be effectuated by a colored characterization of the location or of the region of the possible collision of the component 9 with the production machine 1.

The nonobservance of the boundary conditions RB of the optimized trajectory T_opt should be the exception. Consequently, this display is only shown with dashed lines in FIG. 4. The path "OK" is selected if the optimized trajectory T_opt has been effectuated after passing through the method for calculating the optimized trajectory T_opt by the simulation program S and the boundary conditions RB are satisfied.

Figure 5:
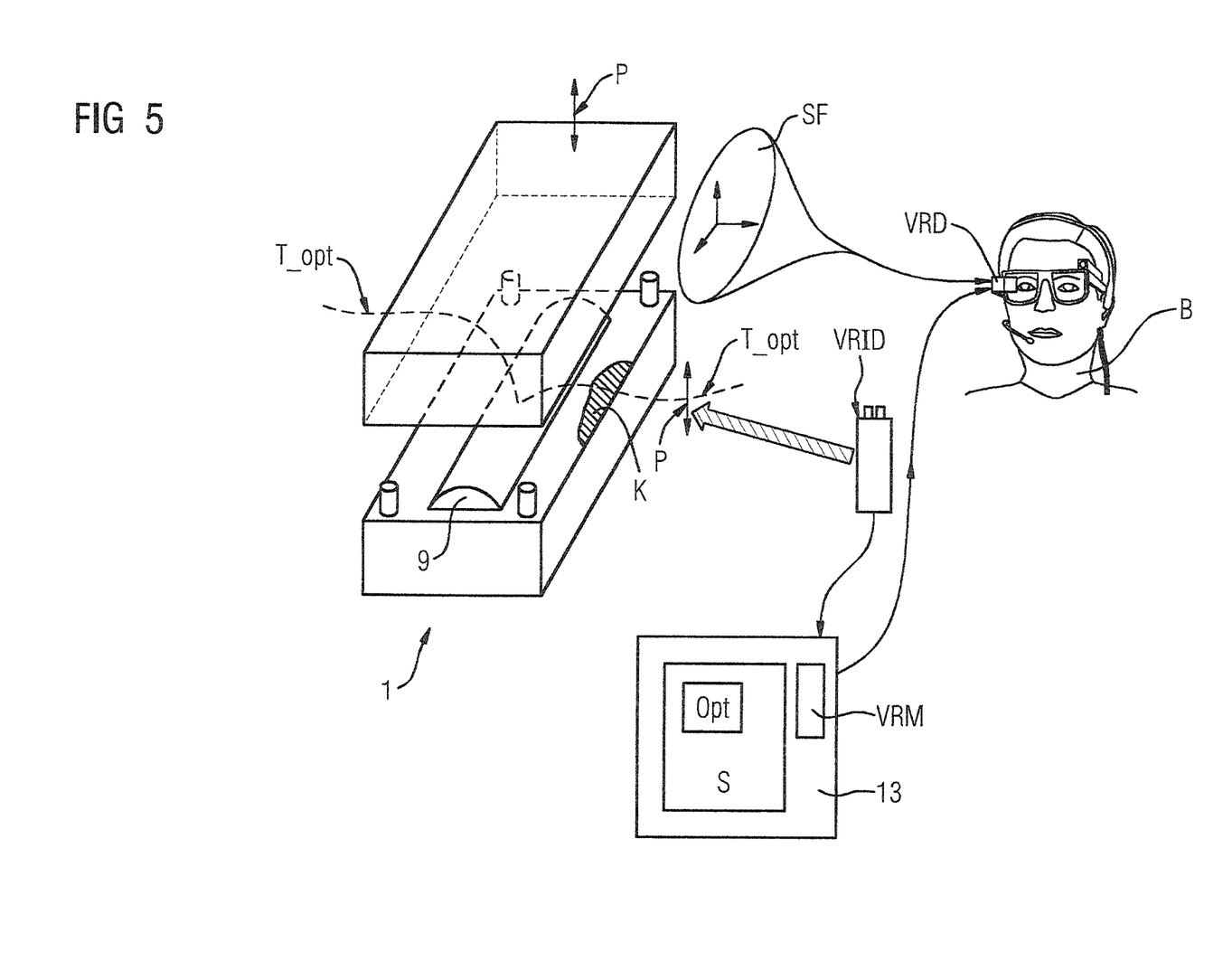
FIG. 5 shows a possible representation for a user.

FIG. 5 shows a possible representation for a user B. The representation in FIG. 5 and FIG. 6 may correspond to what the user B or the users B, B1, B2 see. The user B wears a VR display device VRD, e.g., virtual reality data glasses (head-mounted display). The VR display device VRD shows the user B an observation window SF. The observation window SF shows the user B a section of the production machine 1 and/or of the component 9 that is moving along the optimized trajectory T_opt. The user can modify the alignment/position of the observation window SF, such as by moving his head or by a speech command. Hence, the user B can observe the production machine 1 and/or the component 9 from a plurality of directions and/or a plurality of positions. Speech control may also serve to align the observation window SF.

The optimized trajectory T_opt is provided by the computing unit 13. Here, the simulation program S also serves to calculate the optimized trajectory, with the simulation program S having an optimization routine Opt. The computing unit 13 further has a connector VRM for the 3D display and/or the VR display device, in particular the virtual reality data glasses. Further, the computing unit 13 has a connector for the joystick VRID (virtual reality input device). The user B can move a cursor with the aid of the joystick VRID. The user B can modify the optimized trajectory T_opt by the cursor. Further, the user B can modify the position and the alignment of the component 9 and/or the position of the production machine 1 and, optionally, the position and/or the alignment of a tool of the production machine 1 with the aid of the joystick VRID.

Movements of the tool of the production machine 1 and/or of the optimized trajectory T_opt are illustrated in the figures as arrows P. The change in the observation window SF is likewise symbolized by the arrows arranged in a manner analogous to the tripod.

The effects of the modifications, in particular of the modifications of the optimized trajectory T_opt, are displayed to the user B. Collisions of the component 9 with the production machine 1 are displayed to the user by colored marking of a label K. Optionally, the observation window SF of the user can be steered automatically to the label of the collision.

Figure 6:
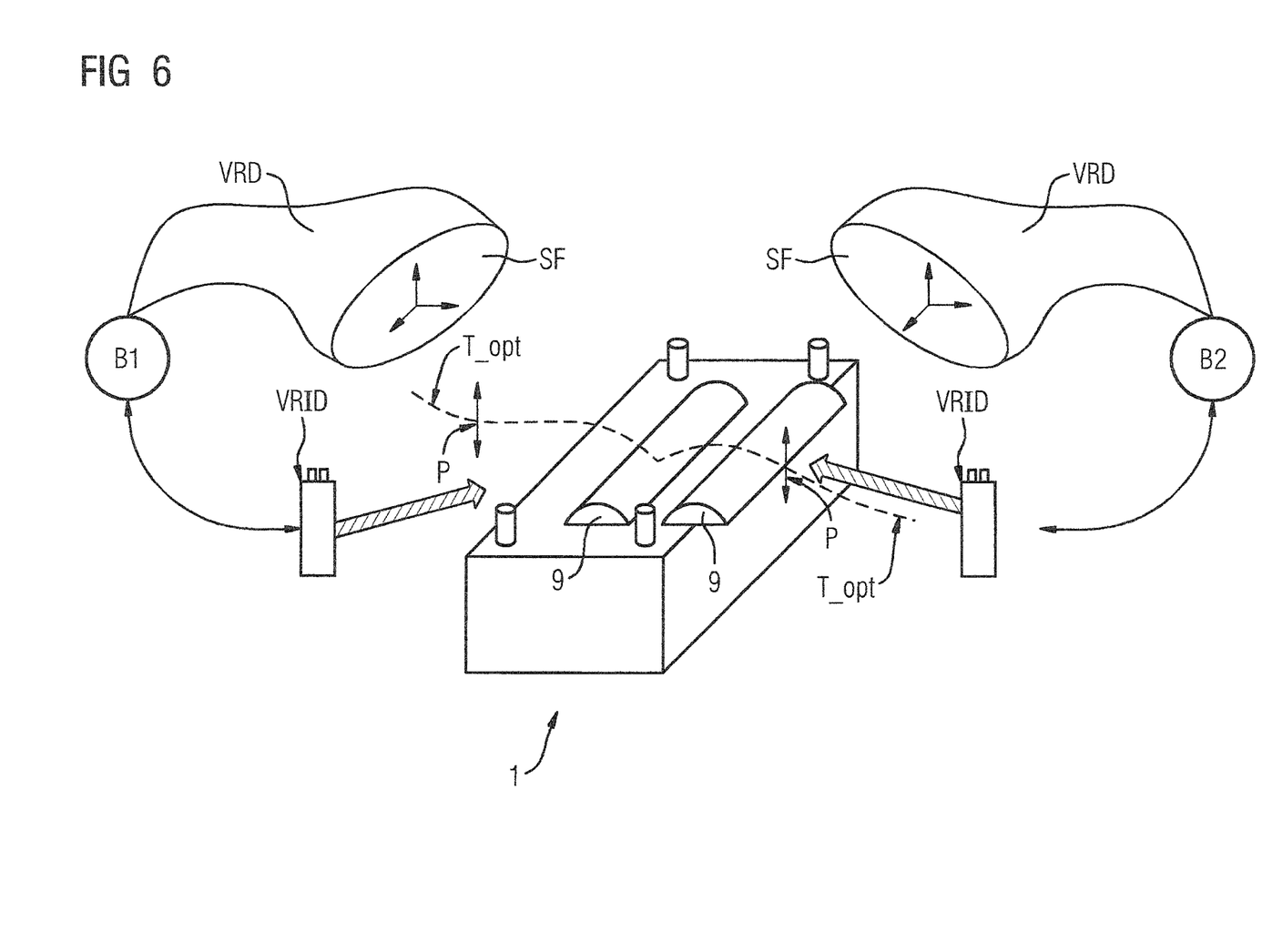
FIG. 6 shows a possible representation for two users.

FIG. 6 shows a possible representation for two users B1, B2. FIG. 6 shows, analogously to FIG. 5, an interaction of a user B1, B2 with the illustrated optimized trajectory T_opt, the illustrated production machine 1 and the illustrated component 9.

The production machine 1 and the two components 9 are displayed to the first user B1 in an observation window SF and/or displayed to the second user B2 in an observation window SF. Advantageously, both users B1, B2 wear a VR display device VRD such that they control the respective observation window SF by aligning the virtual reality data glasses VRD.

With the aid of a joystick VRID or another VR input device, the first user B1 and/or the second user B2 can respectively modify the profile of the optimized trajectory T_opt at least in regions, the position and/or alignment of the component 9 and the position and/or alignment of a tool of the production machine.

Subsequently, the modifications lead to a calculation of a new optimized trajectory T_opt. If the trajectory T_opt, T1 no longer meets the possibly changed modified boundary conditions RB after the modification set forth above, this is presented to a user B1, B2 or to both users B1, B2. The presentation can be effectuated by colored marking of the region affected by the nonobservance of the boundary conditions RB.

In summary, a method which, in particular, is executed by a computer program is described, in which method a production machine 1, in particular a press system, is displayed in three-dimensional space.

The user B, B1, B2 of the computer program product can interact directly with the displayed production machine 1.

The user B, B1, B2 can observe the progressing movements of the production machine 1 and/or of the component 9 from within the production machine 1, in particular via an at least partly transparent representation of the production machine 1 and/or the at least one component 9.

Instead of a mouse movement, the user B, B1, B2 can interact in the 3D space via a joystick VRID, in particular a joystick VRID with a motion sensor.

A tool of a production machine is understood to mean a cutting blade, a stamp, a handling device. If the production machine is formed as a press, the tool is, e.g., a slide, a driver, a downholder or a die cushion.

The user B, B1, B2 can modify the trajectory T1, T_opt of the component 9 and optionally a displacement curve of a tool of the production machine 1 by means of the drag-and-drop method.

An optimized trajectory (as a spatial curve) T_opt of the component 9 is calculated in three-dimensional (3D) space.

A progress of the method for calculating an optimized trajectory T_opt can be displayed to the user B, B1, B2. Collisions of the component 9 with the production machine 1, in particular the press tools 1, are directly presented to the user B, B1, B2 or the users B1, B2. Such a presentation can be effectuated by way of marking by clear highlighting.

Advantageously, the user B, B1, B2 directly identifies the effect of their action in the virtual space with the aid of the VR display device.

Collisions may also occur between tools of the production machine. Advantageously, these are likewise displayed. Collisions at tools of a production machine occur, in particular, in the case of an inappropriate alignment/position of the component in the production machine.

Advantageously, the user B, B1, B2 of the invention can assist the calculation of an optimized trajectory T_opt by virtue of removing the optimized trajectory T_opt from only a local minimum and therefore further optimizing the latter via a manual modification of the optimized trajectory T_opt, in particular via a drag-and-drop procedure.

Advantageously, by way of the use, the user B, B1, B2 can be educated with respect to their understanding of the movement processes in relation to the production machine 1.

Virtual reality display devices, such as Google Glass, Oculus Rift, Microsoft Hololens or a similar instrument, can be used as a VR display device or 3D display. Here, it is irrelevant whether virtual reality, augmented reality or holography are displayed. Advantageously, a plurality of joysticks VRID are used, the joysticks, in particular, being the "Razer Hydra" model manufactured by Sixense Entertainment or Razer.

In particular, the advantage of a contactless control emerges with such a joystick VRID.

Possible fields of application of the invention are tool making, project planning, in particular planning of a factory installations, and equipping of presses 1 or press lines. Further fields of application of the invention may relate to maintenance and/or servicing work, in particular for presses 1. The invention is particularly advantageously suitable for educating staff/users B, B1, B2 and engineers in the field of presses 1.

Essentially, the disclosed embodiment of the invention relate to methods for calculating or providing an optimized trajectory T_opt with the aid of a simulation program S and an optimization routine Opt. During the methods, the trajectory T, T1, Tw is provided with the aid of a simulation program S and adapted to boundary conditions RB. The methods include a loop, where the loop has the provision of the one first trajectory T1, the modification of a (further) trajectory T1, Tw, and the adaptation of the (further) trajectory Tw, T based on boundary conditions RB, all as individual steps. The optimized trajectory T_opt is a trajectory T, Tw that has been provided based on an extremal or predetermined parameter v', v_ex. The optimized trajectory T_opt is provided after the calculation by a control device 11 for moving a holder 7 for a component 9, where the component 9 moving along the optimized trajectory T_opt and/or the production machine 1 are displayed to a user B, B1, B2 with the aid of a 3D display.

Figure 7:
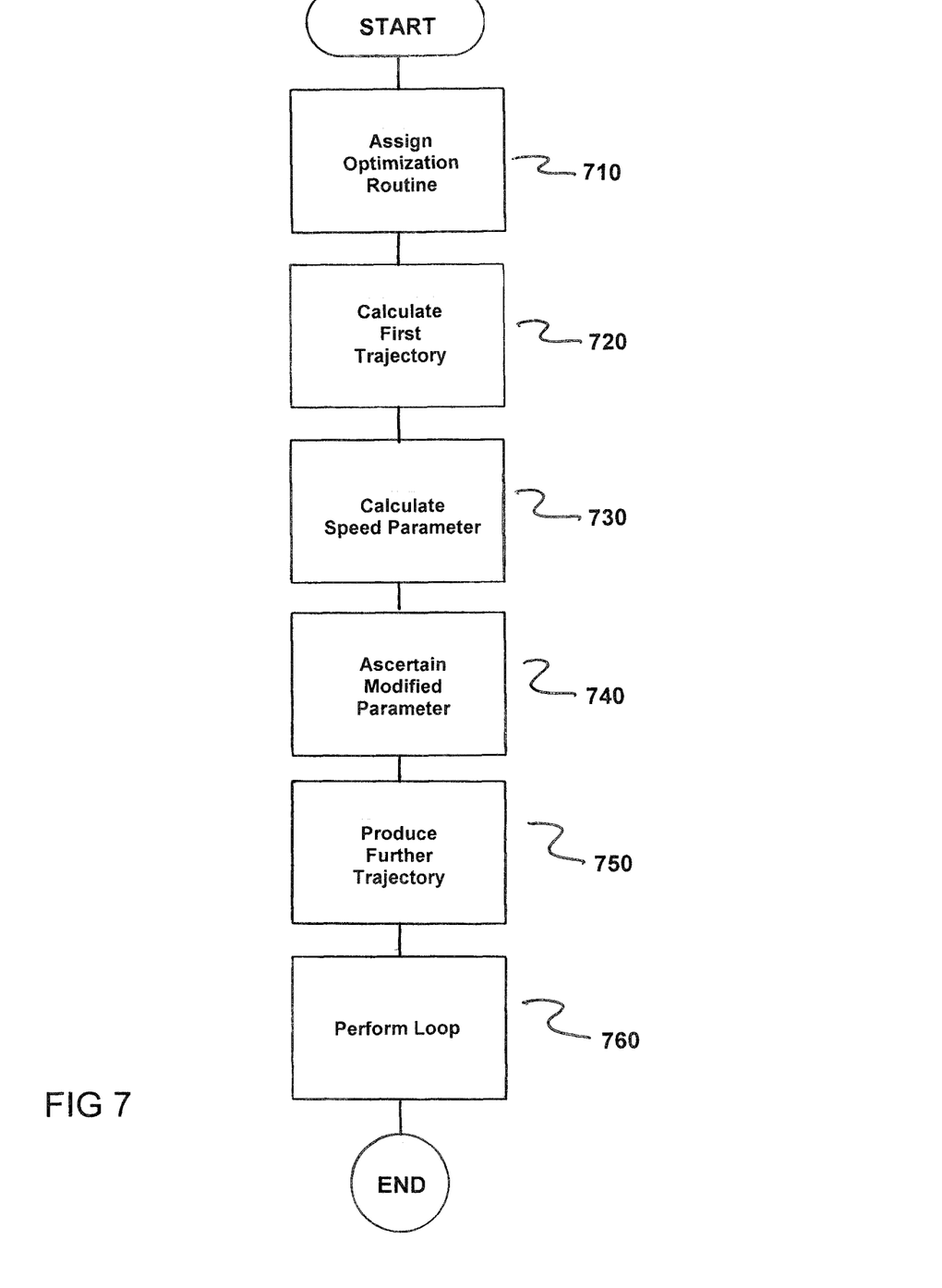
FIG. 7 is a flowchart of the method in accordance with the invention.

FIG. 7 is a flowchart of the method for calculating an optimized trajectory T_opt of at least one component 9 transporting the component 9 into a production machine 1 and/or ii transporting the component 9 out of the production machine 1.

The method comprises assigning at least one optimization routine Opt to a simulation program S that simulates an introduction of the component 9 into the production machine and removal of the component 9 from the production machine, as indicated in step 710.

Next, a first trajectory T1 is calculated utilizing the simulation program S based on boundary conditions RB, as indicated in step 720.

Next, a parameter v comprising speed is calculated from the first trajectory T1 in the at least one optimization routine Opt, as indicated in step 730.

A modified parameter v' is now ascertained via the at least one optimization routine Opt, as indicated in step 740. At least one further trajectory Tw is produced based on the modified parameter v', as indcted in step 750.

The further trajectory Tw is now modified in a loop, as indicated in step 760.

Figure 8:
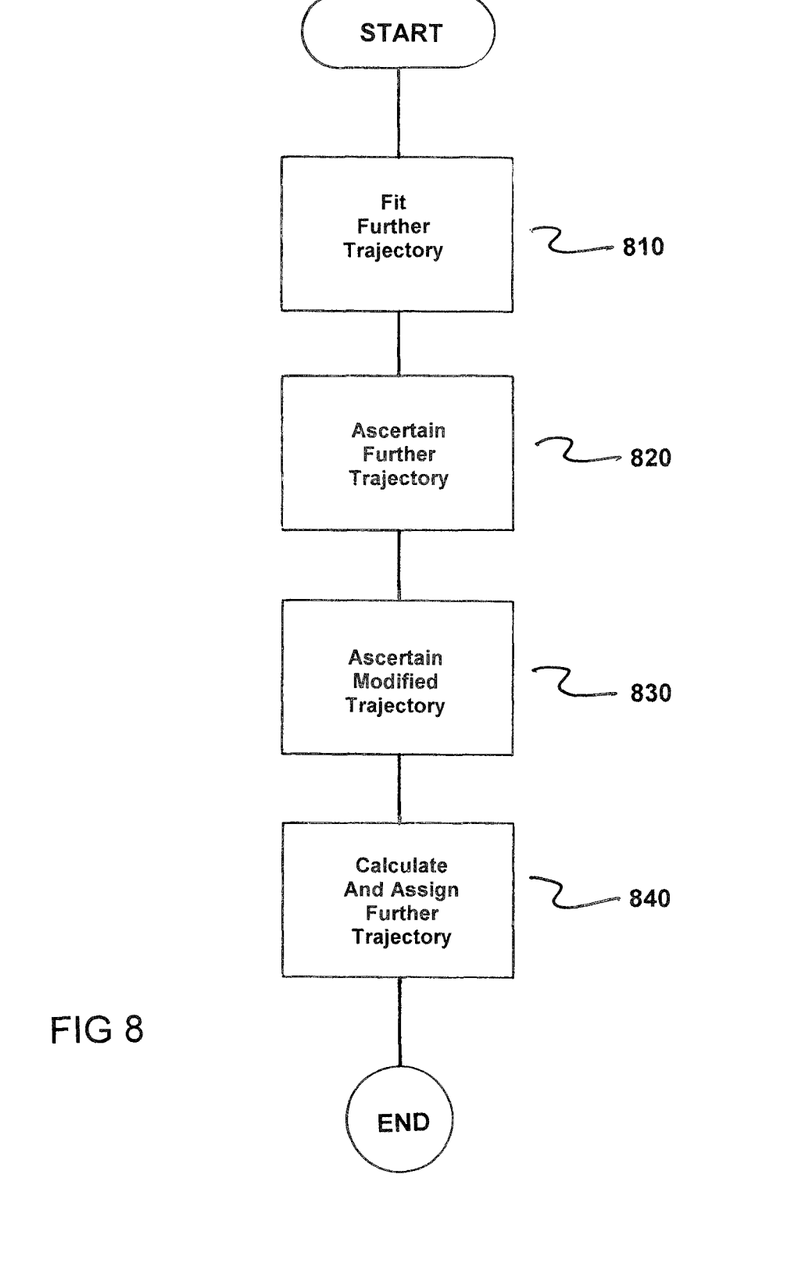
FIG. 8 is a flowchart of the loop of FIG. 7.

As shown in FIG. 8, the loop comprises fitting the further trajectory Tw to the boundary conditions RB and assigning the further trajectory Tw to the optimization routine Opt in one step via the simulation program S, as indicated in step 810. Next, the parameter (v) is ascertained in one step based on the further trajectory (Tw), as indicated in step 820. The modified parameter v' is also ascertained in one step based on the parameter (v), as indicated in step 830. Next, the further trajectory Tw is calculated based on the modified parameter v' and the further trajectory Tw is assigned to the stimulation program S in one step, as indicated in step 840.

In accordance with the invention, the loop is executed until the modified parameter v' reaches a predetermined value v_ex or an extremal value (v_ex). In addition, the optimized trajectory T_opt is calculated from the extremal value v_ex or the predetermined value v_ex and adapted to the boundary conditions RB with the simulation program S.

In accordance with the invention, the at least one component 9 and the production machine 1 are displayed in a 3D display VRD, where the production machine 1 and at least one component 9 are presented in a three-dimensional virtual space aided by the 3D display VRD, and where at least the component 9 is displayed moving along the optimized trajectory T_opt.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for calculating an optimized trajectory of at least one component for at least one of (i) transporting the component into a production machine and (ii) transporting the component out of the production machine, the method comprising:
    assigning at least one optimization routine to a simulation program which simulates an introduction of the component into the production machine and removal of the component from the production machine;
    calculating a first trajectory utilizing the simulation program based on boundary conditions;
    calculating a parameter comprising speed from the first trajectory in the at least one optimization routine;
    ascertaining a modified parameter via the at least one optimization routine;
    producing at least one further trajectory based on the modified parameter; and
    modifying the further trajectory in a loop, said looping comprising at least:
        fitting the further trajectory to the boundary conditions and assigning the further trajectory to the optimization routine in one step via the simulation program;
        ascertaining the parameter in one step based on the further trajectory;
        ascertaining the modified parameter in one step based on the parameter; and
        calculating the further trajectory based on the modified parameter and assigning the further trajectory to the stimulation program in one step;
    wherein the loop is executed until the modified parameter reaches a predetermined value or an extremal value;
    wherein the optimized trajectory is calculated from the extremal value or the predetermined value and adapted to the boundary conditions with the simulation program;
    wherein the at least one component and the production machine are displayed in a 3D display;
    wherein the production machine and at least one component are presented in a three-dimensional virtual space aided by the 3D display; and
    wherein at least the component is displayed moving along the optimized trajectory.

2. The method as claimed in claim 1, wherein an infringement of the boundary conditions by the production machine when moving the component is displayed.

3. The method as claimed in claim 1, wherein the movement of the component and optionally the movement of the production machine is displayed to a user or to a plurality of users.

4. The method as claimed in claim 1, wherein at least one user modifies the optimized trajectory aided by at least one VR input device;
    wherein the optimized trajectory is converted into a first trajectory by the modification;
    wherein the first trajectory is re-optimized and displayed using the method for calculating the optimized trajectory.

5. The method as claimed in claim 1, wherein the production machine and the at least one component are displayed at least partly transparently.

6. The method as claimed in claim 1, wherein a view of at least one of (i) the production machine (1) and (ii) the component is displayable from at least one of (i) a plurality of points and (ii) a plurality of orientations; and wherein at least one of (i) a point from the plurality of points and (ii) a orientation from the plurality of orientations is selectable by a user.

7. The method as claimed in claim 1, wherein at least one of (i) the production machine and (ii) the at least one component is displayed to at least two users; wherein a non-observance of the boundary conditions is displayed to at least one of the at least two users.

8. The method as claimed in claim 1, wherein the non-observance of the boundary conditions comprises a collision between the component and the production machine.

9. A non-transitory computer program product encoded with a computer program executed by a computing unit which causes calculation of an optimized trajectory of at least one component for at least one of (i) transporting the component into a production machine and (ii) transporting the component out of the production machine, the computer program comprising:
    program code for assigning at least one optimization routine to a simulation program which simulates an introduction of the component into the production machine and removal of the component from the production machine;
    program code for calculating a first trajectory utilizing the simulation program based on boundary conditions;
    program code for calculating a parameter comprising speed from the first trajectory in the at least one optimization routine;
    program code for ascertaining a modified parameter via the at least one optimization routine;
    program code for producing at least one further trajectory based on the modified parameter; and
    program code for modifying the further trajectory in a loop, said looping comprising at least:
        program code for fitting the further trajectory to the boundary conditions and assigning the further trajectory to the optimization routine in one step via the simulation program;
        program code for ascertaining the parameter in one step based on the further trajectory;
        program code for ascertaining the modified parameter in one step based on the parameter; and
        program code for calculating the further trajectory based on the modified parameter and assigning the further trajectory to the stimulation program in one step;
        wherein the loop is executed until the modified parameter reaches a predetermined value or an extremal value;
        wherein the optimized trajectory is calculated from the extremal value or the predetermined value and adapted to the boundary conditions with the simulation program;
        wherein the at least one component and the production machine are displayed in a 3D display;
        wherein the production machine and at least one component are presented in a three-dimensional virtual space aided by the 3D display; and
        wherein at least the component is displayed moving along the optimized trajectory.

\* \* \* \* \*